United States Patent [19]
Kviesitis

[11] Patent Number: 6,048,377
[45] Date of Patent: Apr. 11, 2000

[54] TOP DRESSING FOR GARDENS AND LAWNS

[75] Inventor: Boris Kviesitis, Des Moines, Iowa

[73] Assignee: True Pitch, Inc., Altoona, Iowa

[21] Appl. No.: 09/235,035

[22] Filed: Jan. 21, 1999

[51] Int. Cl.⁷ ............................ C05F 11/00; C05F 11/02; C05F 11/08
[52] U.S. Cl. .......................... 71/11; 71/15; 71/16; 71/23; 71/24; 71/903; 47/9; 47/58
[58] Field of Search ................................. 71/16, 903, 24, 71/11, 15, 23; 523/131; 524/9, 28, 55, 261, 312, 442, 446, 492; 427/220, 221, 214; 47/9, 58

[56] References Cited

U.S. PATENT DOCUMENTS

| | | | |
|---|---|---|---|
| 2,652,379 | 9/1953 | Hedrick et al. | 260/41 |
| 3,748,783 | 7/1973 | Sokolies | 47/58 |
| 3,887,506 | 6/1975 | Hewitt | 260/17 |
| 4,074,997 | 2/1978 | Cohen | 71/24 |
| 4,125,392 | 11/1978 | Primo | 71/3 |
| 4,666,497 | 5/1987 | Tenzer | 71/6 |
| 4,792,133 | 12/1988 | Hawkins et al. | 272/3 |
| 4,819,933 | 4/1989 | Armone | 428/87 |
| 4,852,870 | 8/1989 | Hawkins et al. | 272/3 |
| 4,968,024 | 11/1990 | Hawkins | 272/3 |
| 5,151,123 | 9/1992 | Kviesitis | 106/287 |
| 5,254,364 | 10/1993 | Kviesitis | 427/214 |
| 5,264,029 | 11/1993 | Kviesitis | 106/287 |
| 5,286,544 | 2/1994 | Graham | 428/144 |
| 5,583,165 | 12/1996 | Kviesitis | 523/131 |

FOREIGN PATENT DOCUMENTS

| | | | |
|---|---|---|---|
| 9655998 | 8/1996 | Australia | 71/31 |
| 52-21129 | 2/1977 | Japan | 405/264 |
| 56-10584 | 2/1981 | Japan . | |
| 57-102959 | 6/1982 | Japan | 427/221 |
| 58-11729 | 1/1983 | Japan . | |
| 61-44990 | 3/1986 | Japan | 405/264 |

OTHER PUBLICATIONS

"Dakota Peat and Equipment: World Class Excellence", p1–12, 1989.

*Primary Examiner*—Steven P. Griffin
*Assistant Examiner*—Eileen E. Nave
*Attorney, Agent, or Firm*—Zarley, McKee, Thomte, Voorhees & Sease

[57] ABSTRACT

A soil top dressing resulting from the method of taking a quantity of sand comprised of a plurality of sand particles; coating the sand particles with a liquid plasticizer material comprised of a mixture of water and at least one from the group of polyvinyl alcohol, polyvinyl acetate, silicon rubber latex or glycerol, adding a quantity of clay comprised of a plurality of clay particles, along with a quantity of the plasticizer material to the coated sand particles; adding a quantity of kelp to coat said sand coated particles; and coating the kelp with *calamovilla longifolia*.

24 Claims, No Drawings

TOP DRESSING FOR GARDENS AND LAWNS

BACKGROUND OF THE INVENTION

This invention is an improvement over the subject matter of U.S. Pat. Nos. 5,151,123; 5,254,364; 5,264,029; and 5,583,165. These patents relate to a soil composition comprised of clay-coated sand particles. It has been discovered that the material of these patents is an excellent carrier for the well known fertilizer, kelp meal.

However, beneficial as the products of the foregoing patents may be, these products have certain inadequacies in the areas of retaining moisture, particle structural integrity, length of nutrient retention time, consisting of ingredients, shape of particles, high density, compaction prone and soil tilth.

It is therefore a principal object of this invention to provide a soil top dressing that overcomes the foregoing inadequacies by combining with the product of the '165 patent a quantity of peat moss comprised of *calamovilla longifolia* (Dakota™ peat).

More specifically, it is a principal object of this invention to provide a soil top dressing which has a high moisture retention; good particle structural integrity; and which can retain and release nutrients over a long period of time.

A still further object of this invention is to provide a top soil dressing which has a uniform consistency in its ingredients, which has a plurality of irregular shapes, which has a fibrous consistency, which resists soil compaction, and which enhances soil tilth.

These and other objects will be apparent to those skilled in the art.

SUMMARY OF THE INVENTION

A soil top dressing resulting from the method of taking a quantity of sand comprised of a plurality of sand particles; coating said sand particles with a liquid plasticizer material comprised of a mixture of water and at least one from the group of polyvinyl alcohol, polyvinyl acetate, silicon rubber latex or glycerol, adding a quantity of clay comprised of a plurality of clay particles, along with a quantity of said plasticizer material to said coated sand particles, adding a quantity of kelp to coat said sand coated particles, adding a quantity of peat moss material having the physical properties of *calamovilla longifolia*.

A method of making a top soil dressing comprising the foregoing steps. The product of this invention is typically comprised of the following:

| Ingredient | Weight (lbs) |
| --- | --- |
| Sand | 975 |
| Clay | 450 |
| Iron Oxide | 60 |
| Binder | 120 |
| Urea | 8 |
| Kelp Meal | 150 |
| Dakota ™ Peat | 150 |

DESCRIPTION OF THE PREFERRED EMBODIMENT

Dakota™ peat moss is a product of natural decomposition of common reed grass decaying in its own marsh habitat. The scientific name of such peat moss is *calamovilla longifolia*. Decaying reed grasses such as *phragmites communis* and *calmorilla canadenis* result in Dakota™ peat moss (hereafter "CL moss").

The CL moss when commercially processed, screened and dried, has a density of about 40 pounds per cubic foot as compared to 80–85 pounds per cubic foot of the top dressing product of the '165 patent. Typical analysis of the CL moss by weight is as follows:

| | |
| --- | --- |
| Water | 25% |
| Ash | 3% |
| Woody fiber | 50% |
| Humus acid | 22% |
| Ammonia | 2–3% |
| Phosphoric acid and potash | 0.10–0.20% |

The ingredients of the various components are disclosed in more detail in Tables I–V of the '165 patent which is incorporated herein by reference.

A typical formulation of the product of this invention and the mixing times for each stage are as follows:

TABLE I

Table of Ingredients and Mixing Time

| Ingredient | Preferred Weight (lbs) | Weight (lbs) Preferred Range of Weight/Total Weight | Mixing Time (Minutes) |
| --- | --- | --- | --- |
| Sand (Silicon Dioxide) | 975 | 50–70% | 2 |
| Polymer (Polyvinyl Alcohol -Plasticizer) | 60 | 0.4–5.0% | 2 |
| Glycerol (Plasticizer) | 60 | 0.5–5.0% | 2 |
| Water (H$_2$O) | 150 | 5–20% | 2 |
| Clay (Hydrated Aluminum Silicate) | 450 | 10–40% | 2 |
| Coloring Pigment (Iron Oxide) | 60 | 1–5% | 2 |
| Urea (NH$_2$)$_2$ CO | 8 | 0.5%–1.0% | 2 |
| Kelp Meal (Ascophyllum Nodosum) | 150 | 5–20% | 2 |
| Dakota ™ Peat Moss | 150 | 5–20% | 2 |

The foregoing ingredients serve to add the CL moss to the composition of the product of the '165 patent which disclosure is incorporated hereby by reference.

The method of making the top dressing of this invention involves continuously mixing the polyvinyl alcohol with water in the proportions indicated to create a plasticizer in the form of a viscous-like substance. A quantity of sand is introduced into an agitation mixer, and a portion of the urea is introduced into the mixer to mix with the sand. A portion of the plasticizer is introduced into the mixer to coat the sand and urea. A portion of clay is then introduced into the mixer, whereupon plasticizer, and clay are introduced in turn in accordance with the above proportion to complete the composition. Care should be exercised to introduce the plasticizer following the introduction of additional clay so that sand particles can be coated with both the plasticizer and clay. A portion of the coloring substance is added into the mixture and mixing continues. Finally, the specified quantity of the kelp meal is added to coat the particles of the sand and clay.

The CL moss is added during the last mixing cycle. It is in granular form. The last cycle involves spraying binder on the preceding mixture which has kelp meal on the particle surfaces. The CL peat moss then covers the kelp meal.

The use of urea is helpful but not critical. It is added when the sand is provided to provide uniform particles. The urea acts as a hardening agent because it reacts chemically with the polyvinyl alcohol. The urea also enhances the nutrients of the kelp meal by permitting the kelp to act more quickly, i.e., to release nutrients more quickly. The resulting product is more active when urea is used.

The resulting product can be used for soil maintenance purposes on gardens or lawns either as a top dressing, or by mixing it with the soil. The presence of the kelp meal will stimulate biological activities of the soil bacteria and will stimulate the plants utilization of fertilizers, humus, and other soil elements.

The CL moss will enhance the foregoing mixture as described above.

The CL moss decreases the density of the resulting product. The fibrous material then decays normally for a year or more to continuously supply nutrients to the soil. This fibrous material absorbs and retains moisture to enhance plant growth. Its use reduces soil compaction and adds to the tilth thereof. CL moss is very consistent in its quality regardless of the source, and is highly nutritious, unlike some moss such as sphagnum moss. Further, CL moss does not have undesirable products as do other mosses.

The combined product of this invention is vastly superior to either the product of the '165 patent or the use of CL moss by itself. The CL moss additive permits the '165 patent product to thrive in adverse situations where it will not be greatly effective on its own.

Therefore, it is seen that this invention will achieve at least all of its stated objectives.

What is claimed is:

1. A soil top dressing, resulting from the method of:
   taking a quantity of sand comprised of a plurality of sand particles;
   coating said sand particles with a liquid plasticizer material comprised of a mixture of water and at least one selected from the group consisting of polyvinyl alcohol, polyvinyl acetate, silicon rubber latex and glycerol;
   adding a quantity of clay comprised of a plurality of clay particles, along with a quantity of said plasticizer material to said coated sand particles;
   adding a quantity of kelp to coat said coated sand particles; and
   adding a quantity of peat moss material having the physical properties of *calamovilia longifolia*.

2. The soil top dressing of claim 1, wherein said quantity of kelp is kelp meal.

3. The soil top dressing of claim 1, wherein said peat moss material includes fibrous material to absorb and retain moisture when the soil top dressing is applied to an earthen surface, and the fibrous material having the characteristics of decaying over a long period of time to release nutrients to the soil top dressing over said period of time.

4. A soil top dressing, resulting from the method of:
   taking a quantity of sand comprised of a plurality of sand particles;
   coating said sand particles with a premixed liquid plasticizer material comprised of at least one selected from the group consisting of polyvinyl alcohol, polyvinyl acetate, rubber latex and glycerol;
   adding a quantity of clay to the coated sand particles to form a coating of said clay on the coated sand particles;
   adding an additional outer coating of the premixed liquid plasticizer on top of the sand particles coated with the coating of said clay;
   coating said outer coating with a kelp material; and
   adding a quantity of peat moss material having the physical properties of *calamovilla longifolia*.

5. The soil top dressing of claim 4, wherein said quantity of kelp is kelp meal.

6. The soil top dressing of claim 4, wherein said peat moss material includes fibrous material to absorb and retain moisture when the soil top dressing is applied to an earthen surface, and the fibrous material having the characteristics of decaying over a long period of time to release nutrients to the soil top dressing over said period of time.

7. A method of making a top dressing material for soil, comprising:
   placing sand particles in an agitation mixer;
   adding to said sand particles at least one coating material selected from the group consisting of polyvinyl alcohol, polyvinyl acetate, polyvinyl chloride, natural or synthetic rubber latex, and glycerol to form a coating on said sand particles;
   adding clay to said agitation mixer to form a coating of clay on said sand particles coated as above;
   coating said coating of clay with a kelp material; and
   adding a quantity of peat moss material having the physical properties of *calamovilla longifolia*.

8. The method of claim 7, wherein said quantity of kelp is kelp meal.

9. The method of claim 7, wherein said peat moss material includes fibrous material to absorb and retain moisture when the soil top dressing is applied to an earthen surface, and the fibrous material having the characteristics of decaying over a long period of time to release nutrients to the soil top dressing over said period of time.

10. The soil top dressing of claim 1, wherein said peat moss material is *calamovilla longifolia*.

11. The soil top dressing of claim 4, wherein said peat moss material is *calamovilla longifolia*.

12. The method of claim 7, wherein said peat moss material is *calamovilla longifolia*.

13. The soil top dressing of claim 1, wherein the peat moss material is *calamovilla longifolia* in granular form.

14. The soil top dressing of claim 13, wherein the *calamovilla longifolia* is placed in overlapping condition on the kelp to provide a coating therefore.

15. The soil top dressing of claim 4, wherein a coating of *calamovilla longifolia* is placed on the kelp material.

16. The method of claim 7, wherein a coating of *calamovilla longifolia* is placed on the kelp material.

17. The soil top dressing of claim 4, wherein a coating of *calamovilla longifolia* is placed on the kelp material by first spraying a binder material on the kelp material.

18. The method of claim 7, wherein a coating of *calamovilla longifolia* is placed on the kelp material by first spraying a binder material on the kelp material.

19. The soil top dressing of claim 1, wherein a binder is sprayed on the kelp, and a layer of *calamovilla longifolia* is adhered to the kelp by the binder.

20. The method of claim 7, wherein said peat moss material comprises 5–20% by weight of the resulting material.

21. The method of claim 7, wherein said peat moss material and kelp material comprises 5–20% by weight of the resulting material.

22. The method of claim 18, wherein the clay comprises 10–40% by weight of the resulting material.

23. The method of claim 22, wherein the sand comprises 50–70% by weight of the resulting material.

24. A soil top dressing resulting from the method of:

taking a quantity of sand comprised of a plurality of sand particles;

coating said sand particles with a liquid plasticizer material comprised of a mixture of water and at least one selected from the group consisting of polyvinyl alcohol, polyvinyl acetate, silicon rubber latex and glycerol;

adding a quantity of clay comprised of a plurality of clay particles, along with a quantity of said plasticizer material to said coated sand particles;

adding a quantity of kelp to coat said coated sand particles; and adding a quantity of peat moss material having the physical properties of *calamovilla longifolia*, whereby the peat moss material comprises 5–20% by weight of the soil top dressing.

\* \* \* \* \*